Patented Mar. 14, 1950

2,500,283

UNITED STATES PATENT OFFICE 2,500,283

DERIVATIVES OF 2-AMINOPYRIMIDINES AND THE PROCESSES FOR PRODUCING THE SAME

Harris L. Friedman and Alexander V. Tolstoouhov, New York, N. Y., assignors to Pyridium Corporation, Yonkers, N. Y., a corporation of New York No Drawing. Application April 8, 1946, Serial No. 660,428

12 Claims. (Cl. 260—251)

Our invention relates to the process of preparing derivatives of 2-aminopyrimidines and its homologues and relates particularly to substitutions on the amino group.

It is known that condensation products of 2-aminopyrimidines can be prepared by reacting the amide with sodamide and then further reacting the formed sodium salt with alkylhalides in toluene suspension.

We have found that we can condense aromatic aldehydes with aminopyrimidines in the presence of formic acid and thus obtain compounds of considerable value.

The technical advantages of our process are obvious. We do not have to react the amines with sodamide, a compound, which is hazardous and difficult to produce.

Furthermore, the reaction of the prior process with sodamide is carried out in toluene which is a highly inflammable liquid. As our reaction is carried out by refluxing the aldehydes with the aminopyrimidines and formic acid, there is no fire hazard and this constitutes a further advantage of our invention.

Other advantages will be recognized from the specification as it continues.

The general formula of our product is

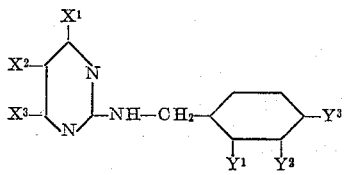

in which $X^1$, $X^2$ and $X^3$ may represent hydrogen, halogen groups, nitro groups or lower alkyl groups; and in which $Y^1$, $Y^2$, $Y^3$ may represent hydrogen, alkyl groups or alkoxy groups.

By "lower alkyl groups" we means those compounds containing the groups recognized generally as lower alkyls, such as methyl-, ethyl-, propyl-, and butyl-.

By "alkoxy groups" we mean those compounds containing the groups recognized generally as alkoxy groups such as methoxy-, ethoxy-, propyloxy-, and butyloxy-.

These new compounds, which are pyrimidine derivatives, form valuable intermediates in the preparation of compounds having chemotherapeutic and other valuable properties.

The following are several illustrative examples of the preferred procedure of carrying out the present invention, which are given for illustration and not for limitation.

Example I 95 grams of 2-aminopyrimidine, 106 grams of benzaldehyde and 200 cc. of anhydrous formic acid were placed into a flask. A complete solution was obtained, which was refluxed at 118–120° C. for 29 hours uninterrupted. The mixture was then poured into water and potassium hydroxide pellets were added until pH 7.0 when the free base started to separate on top as a heavy oil which was separated from the aqueous layer. The crude oil was fractionated without previous drying. The main fraction, a colorless liquid, B. P. 143–144° C. at 2.5 mm. was collected. Its melting point is 77–78° C. The product forms a hydrochloride, M. P. 227–232° C.

Example II 30 grams of 2-aminopyrimidine, 43 grams of anisaldehyde and 60 cc. of anhydrous formic acid were placed into a flask. A complete solution was obtained, which was refluxed at 130° C. for 31 hours. After cooling the mixture was poured into water, made alkaline and extracted with ether. The ether was then distilled off, and the residue vacuum distilled. The boiling point of the product is 175–176° C. at 1.5–2 mm. Its melting point is 111–112° C.

Example III 2.4 grams of 2-aminopyrimidine, 5 grams of 2-ethoxy, 1-naphthaldehyde and 20 cc. of anhydrous formic acid were refluxed at 125° C. by gentle boiling for 35 hours, and then the mixture was poured into water. The solution was made alkaline and extracted with ether. The ether was evaporated and the residue recrystallized from methanol. The melting point of the product is 178–180° C.

Example IV 43.2 grams of 2-amino, 4-chloropyrimidine, 35 grams of benzaldehyde and 50 cc. of anhydrous formic acid were refluxed for 24 hours. The reaction mixture was poured into water, and adjusted to pH 4.0 with sodium hydroxide. The precipitate was collected, dried and recrystallized from methanol. The melting point of the product is 272° C. with decomposition.

Example V 5 grams of 2-amino, 5-nitropyrimidine, 3.37 grams of benzaldehyde and 10 cc. of anhydrous formic acid were refluxed for 7 hours. After cooling the reaction was diluted with water, made alkaline with sodium hydroxide, and extracted with ether. The ether was distilled off and the residue recrystallized from hot methanol. The melting point of the product is 182–184° C.

Example VI 30.7 grams of 2-amino, 4.6-dimethylpyrimidine, 26.7 grams of benzaldehyde and 60 cc. of anhydrous formic acid were refluxed for 36 hours. After cooling the reaction product was poured on ice and the tarry product purified by several crystallizations. Finally the product crystallized from ethanol had a melting point of 111–112° C.

*Example VII*

54.5 grams of 4-methyl, 2-aminopyrimidine, 53 grams of benzaldehyde and 110 cc. of anhydrous formic acid were refluxed for 36 hours. The reaction product was worked up as in Example VI and the product obtained has a melting point of 85–86° C. The boiling point is 156–157° C. at 3.7 mm.

*Example VIII*

54.5 grams of 2-amino, 4-methylpyrimidine, 68 grams of anisaldehyde and 110 cc. of anhydrous formic acid were refluxed for 26 hours. The reaction product was worked up as in Example VI and the melting point of the product obtained is 194–195° C.

By changing the substituents on the aminopyrimidine and on the benzene ring different embodiments of our invention may be made without departing from the spirit thereof.

We do not limit ourselves to the specifically mentioned times, temperatures, quantities, chemicals or steps of procedure as these are given simply to clearly describe our invention as set forth in our specification and claims, and they may be varied without going beyond the scope of our invention.

What we claim is:

1. A process of producing amino substituted pyrimidines which comprises reacting a member of the group consisting of 2-aminopyrimidine and 2-aminopyrimidine compounds with an aromatic aldehyde in the presence of formic acid and isolating the product thus formed.

2. A process of producing amino substituted pyrimidines which comprises reacting a member of the group consisting of 2-aminopyrimidine and 2-aminopyrimidine compounds with an aromatic aldehyde in the presence of formic acid, refluxing the reaction mixture, rendering the mixture alkaline by the addition of an alkali and isolating the product thus formed.

3. A process of producing amino substituted pyrimidines which comprises reacting a member of the group consisting of 2-aminopyrimidine and 2-aminopyrimidine compounds with an aromatic aldehyde of the group consisting of aldehydes, alkyl aldehydes and alkoxy aldehydes in the presence of formic acid and isolating the product thus formed.

4. A process of producing amino substituted pyrimidines which comprises reacting a member of the group consisting of 2-aminopyrimidine and 2-aminopyrimidine compounds with an aromatic aldehyde of the group consisting of aldehydes, alkyl aldehydes and alkoxy aldehydes in the presence of formic acid, refluxing the reaction mixture, rendering the mixture alkaline by the addition of an alkali and isolating the product thus formed.

5. A process of producing amino substituted pyrimidines which comprises reacting a member of the group consisting of 2-aminopyrimidine and 2-aminopyrimidine compounds with benzaldehyde in the presence of formic acid and isolating the product thus formed.

6. A process of producing amino substituted pyrimidines which comprises reacting a member of the group consisting of 2-aminopyrimidine and 2-aminopyrimidine compounds with benzaldehyde in the presence of formic acid, refluxing the reaction mixture, rendering the mixture alkaline by the addition of an alkali and isolating the product thus formed.

7. A process of producing amino substituted pyrimidines of the general formula:

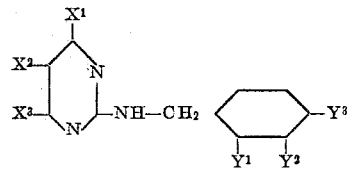

in which $X^1$, $X^2$, and $X^3$ may represent a member of the group consisting of hydrogen, a halogen group, a nitro group and lower alkyl groups; and in which $Y^1$, $Y^2$, and $Y^3$ may represent a member of the group consisting of hydrogen, alkyl groups and alkoxy groups, which comprises reacting a member of the group consisting of 2-aminopyrimidine and 2-aminopyrimidine compounds with an aromatic aldehyde in the presence of formic acid and isolating the compound thus formed.

8. A process of producing amino substituted pyrimidines of the general formula:

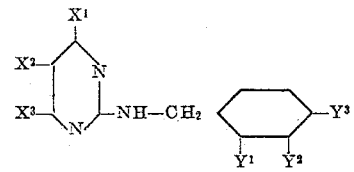

in which $X^1$, $X^2$, and $X^3$ may represent a member of the group consisting of hydrogen, a halogen group, a nitro group and lower alkyl group; and in which $Y^1$, $Y^2$, and $Y^3$ may represent a member of the group consisting of hydrogen, alkyl groups and alkoxy groups, which comprises reacting a member of the group consisting of 2-aminopyrimidine and 2-aminopyrimidine compounds with an aromatic aldehyde in the presence of formic acid, refluxing the reaction mixture, rendering the mixture alkaline by the addition of an alkali.

9. 2-benzylaminopyrimidine.

10. 2-(p-methoxybenzyl) aminopyrimidine.

11. 2-benzylamino, 4-6-dimethylpyrimidine.

12. Amino substituted pyrimidines having the general formula:

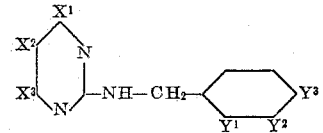

in which $X^1$, $X^2$ and $X^3$ are members of a group consisting of hydrogen, halogens, nitro radicals, and lower alkyl radicals, and in which $Y^1$, $Y^2$ and $Y^3$ are members of a group consisting of hydrogen, alkyl radicals and alkoxy radicals.

HARRIS L. FRIEDMAN.
ALEXANDER V. TOLSTOOUHOV.

REFERENCES CITED

The following references are of record in the file of this patent:

UNITED STATES PATENTS

| Number | Name | Date |
|---|---|---|
| 2,406,594 | Djerassi et al. | Aug. 27, 1946 |